United States Patent [19]

Billing et al.

[11] Patent Number: 4,601,408

[45] Date of Patent: Jul. 22, 1986

[54] NAIL FEEDING DEVICE

[76] Inventors: Lars T. Billing, Värmlandsgatan 2, Helsingborg; Stig Olofsson, Angantyrvägen 1, Djursholm, both of Sweden

[21] Appl. No.: 573,934

[22] PCT Filed: May 20, 1983

[86] PCT No.: PCT/SE83/00199

§ 371 Date: Jan. 6, 1984

§ 102(e) Date: Jan. 6, 1984

[87] PCT Pub. No.: WO83/04209

PCT Pub. Date: Dec. 8, 1983

[30] Foreign Application Priority Data

May 28, 1982 [SE] Sweden ................. 8203346

[51] Int. Cl.$^4$ .................... B23Q 7/12; B65H 9/00
[52] U.S. Cl. .................... 221/168; 221/188
[58] Field of Search ............... 221/163, 165, 167, 168, 221/180, 188, 178, 183, 193, 210, 220

[56] References Cited

U.S. PATENT DOCUMENTS

| | | | |
|---|---|---|---|
| 509,732 | 11/1893 | Hahn | 221/167 |
| 1,257,550 | 2/1918 | Townsend | 221/220 X |
| 1,812,501 | 6/1931 | Strobel | 221/163 X |
| 1,888,851 | 11/1932 | Donovan et al. | 221/165 X |
| 2,431,831 | 12/1947 | Sabaitis | 221/163 |
| 3,026,000 | 3/1962 | Haberstump | 221/167 X |
| 3,269,594 | 8/1966 | MacKenzie et al. | 221/168 X |

Primary Examiner—F. J. Bartuska
Attorney, Agent, or Firm—Ostrolenk, Faber, Gerb & Soffen

[57] ABSTRACT

A device for the positioning and individual feeding of nails comprises a nail filling container which is pivotal upwards and downwards about a horizontal pivot shaft and in the bottom of which there are formed one or more slots which are substantially perpendicular to said pivot shaft and in which the shanks of the nails can be accommodated while the nails are maintained suspended by their upper parts, for instance their heads. According to the invention, each slot (22) passes and extends beyond the wall located at the discharge end of the container (21), and forms a feed slot (22', 22'') which protrudes outside the container (21) and in the end portion (30) of which there is provided a stop (25) of such a design that the outermost nail (28) of the fed nails (23'') is maintained in a correct position at the outermost end of said end portion (30) which is spaced from said pivot shaft (24) such that the end portion will perform a substantially vertical oscillating movement between a lower end position (27) and an upper end position (26). The end portion (30) of the feed slot may have a depression which is of such a length that only one nail (28) can be received in the depression between the stop (25) and the shoulder of the depression which is located at the proximal end thereof with respect to the pivot shaft (24). A gripping member (29) is adapted to seize the nail-carrying upper part of the outermost nail (28) when in the upper position of oscillation (26) of the end portion (30). The oscillating movement has such a magnitude that the outermost nail (28) is completely withdrawn from the end portion (30) of the feed slot when the end portion occupies its lower end position (27). The gripping member (29) is adapted to horizontally displace the nail (28) a certain distance (35) for supplying it to the nailing site.

3 Claims, 16 Drawing Figures

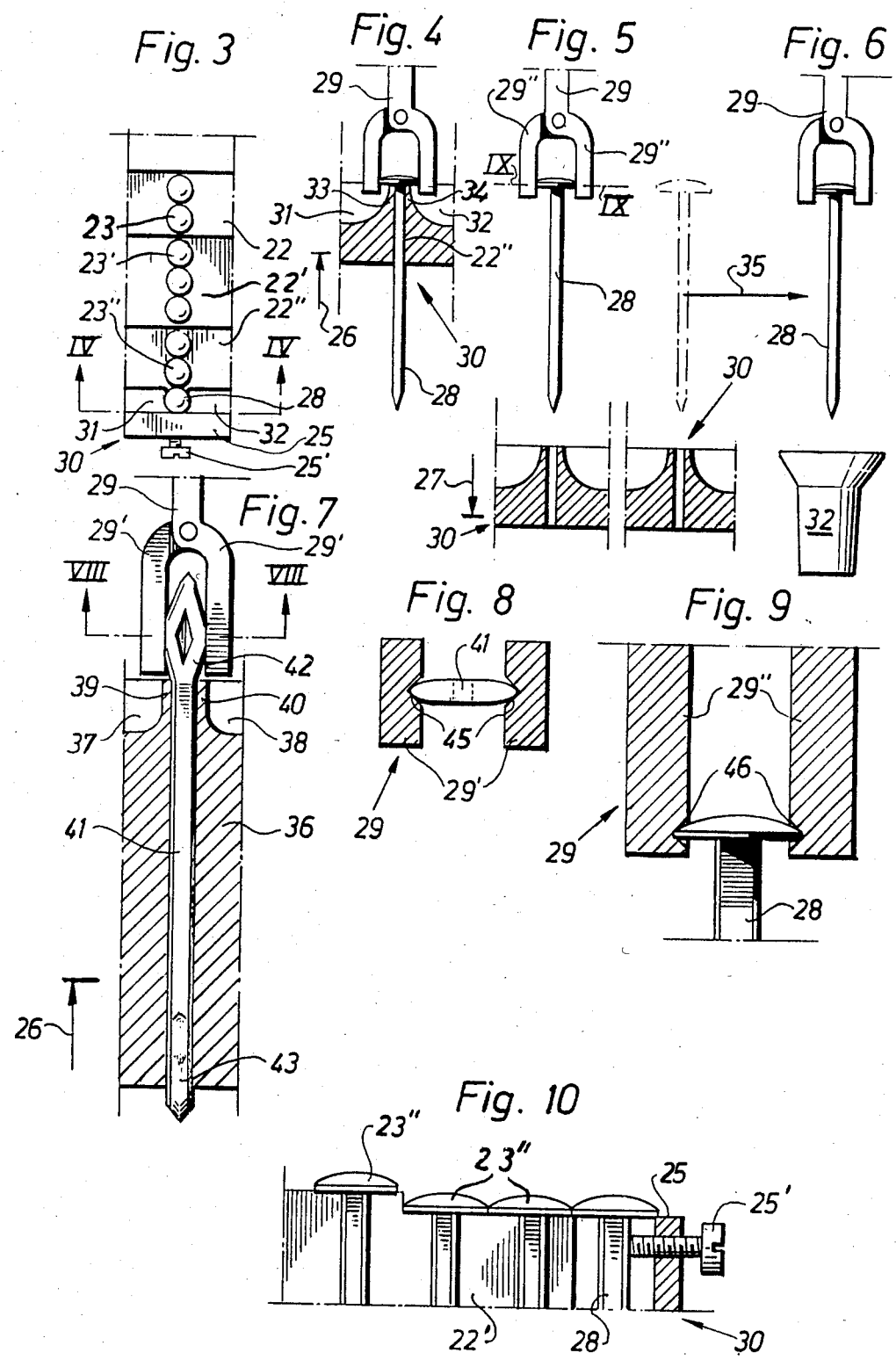

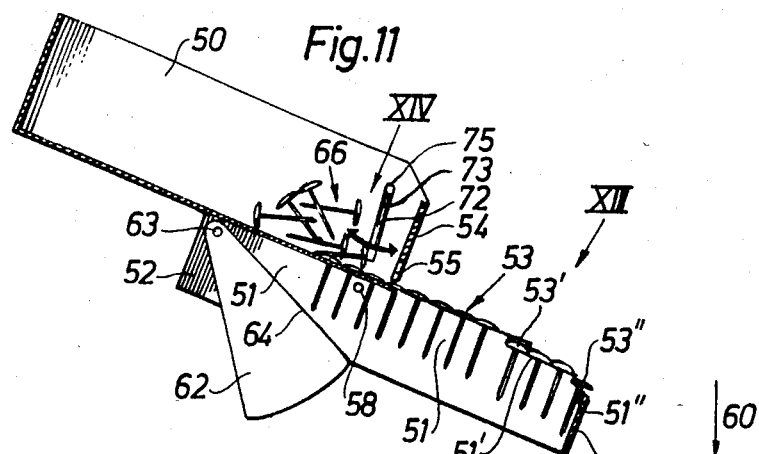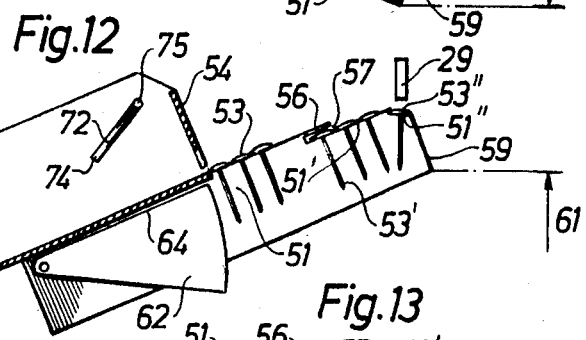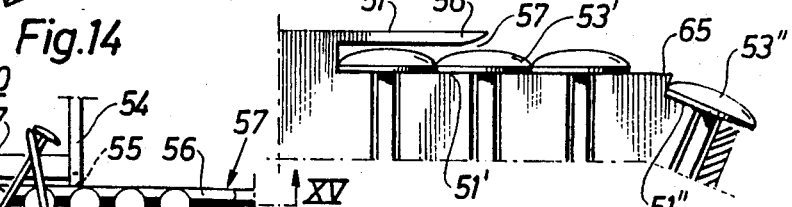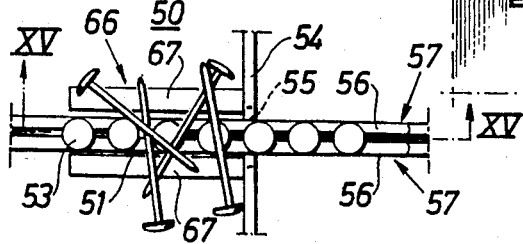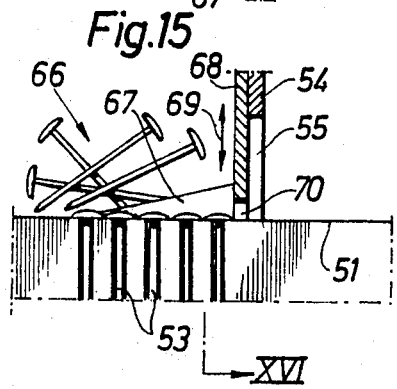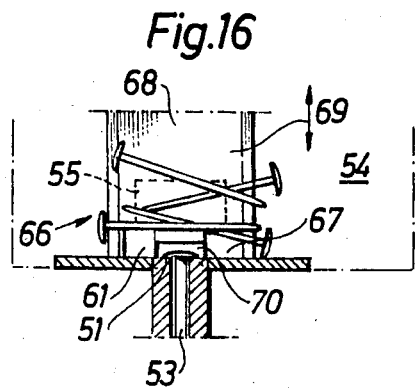

NAIL FEEDING DEVICE

The present invention relates to a device for the positioning and individual feeding of nails from a nail receiving container into which the nails are filled, up to a mechanical device for applying the nails.

Such devices are known in which the nail filling container performs a rocking or oscillating movement about the horizontal plane, such that the nails are displaced back and forth in the container whose bottom is provided with one or more slots into which the nails which happen to be located at the slot or slots and are oriented in the longitudinal direction thereof, can swing into place so as to be suspended in a row by their heads. At the oscillating movement of the container these nails will slide back and forth in the slot. The container pivots about an axis at its front edge and the nails, at this edge, are fed from the movable slots in the pivoting container out into stationary slots which are downwardly sloping towards a discharge device. This device moves the nails laterally and releases them over a collecting funnel from which the nails are conveyed in hoses or tubes to the starting position for the mechanical nailing operation.

Positioning and feeding devices of this type suffer from several drawbacks, for instance in that nails in the filling container will slide back and forth in the slot such that they may get stuck and cause wear, and also in that the nails located in the slot of the pivoting filling container will swing to and fro with respect to the nails suspended in the stationary feed slot with the additional risk of jamming and obstruction of the nails in their slots. From the stationary sloping feed slots the nails are individually fed laterally by means of a reciprocating shuttle which feeds the nails to a conveyor supplying them to the nailing site. In this feed mechanism, too, there is a great risk that the nails will jam and obstruct the function of the device.

In addition, a device of this type is restricted to certain types of nails, especially standard nails provided with heads.

The present invention completely overcomes these drawbacks and offers advantages which ensure high operational reliability in a nail positioning and feeding device and also a long life of the equipment.

According to a first aspect of the invention, this object is achieved by the provision of a device for the positioning and individual feeding of nails, comprising a nail receiving container which is pivotal upwards and downwards about a horizontal pivot shaft and in the bottom of which there are formed one or more slots which are substantially perpendicular to said pivot shaft and in which the shanks of the nails can be accommodated while the nails are maintained suspended by their upper parts, for instance their heads, the device being characterized in that each slot passes and extends beyond the wall located at the discharge end of the container, and forms a feed slot which protrudes outside the container and in the end portion of which there is provided a stop of such a design that the outermost nail of the fed nails is maintained in a correct position at the outermost end of said end portion which is spaced from said pivot shaft such that the end portion will perform a substantially vertical oscillating movement between a lower end position and an upper end position.

According to a second aspect of the invention, the end portion of the feed slot has a depression which is of such a length that only one nail can be received in the depression between the stop and the shoulder of the depression which is located at the proximal end thereof with respect to the pivot shaft.

According to a third aspect of the invention, the end portion, at the sides of the slot, has recesses of such a size that they will leave, at the upper portion of the slot, guide strips which are adapted to carry the nails and which, transversely of the direction of feed, have an outer dimension which is smaller than the outer dimension of the nail portion, for instance the diameter of the nail head, which supports the nail in the slot.

According to a fourth aspect of the invention, the stop is a set screw adjustable in the direction of feed of the nails.

According to a fifth aspect of the invention, the slot, in the direction of feed, has progressively depressed portions, which are delimited by shoulders, towards the end portion, whereby the nails carried in the respective slot portions will be prevented from sliding in a direction contrary to the direction of feed as the end portion occupies its upper end position.

According to a sixth aspect of the invention, a gripping member with resilient gripping means is adapted to seize the nail-carrying upper part of the outermost nail when the end portion has swung the outermost nail to its upper end position, this oscillating movement having such a magnitude that the outermost nail is completely withdrawn from the end portion of the feed slot when said end portion occupies its lower end position.

According to a seventh aspect of the invention, the gripping member is adapted to horizontally displace the nail withdrawn from the slot, a certain distance for supplying it to a nail-collecting device disposed beside the feeding device and adapted to convey the nail to the nailing site.

According to an eighth aspect of the invention, the resilient gripping means of the gripping member has internal grooves provided transversely of the longitudinal direction of the outermost nail and adapted to engage the head of a nail.

According to a ninth aspect of the invention, the resilient gripping means of the gripping member has internal grooves extending in the longitudinal direction of the outermost nail and adapted to accommodate and engage an outwardly bent portion for riveting which extends transversely of the longitudinal direction of the nail.

According to a tenth aspect of the invention, the end portion is adjustable with respect to the adjoining portion of the slot.

According to an eleventh aspect of the invention the height of the side walls of the slot is greater than the full length of the suspended nails.

According to a twelfth aspect of the invention an ejector plate is pivoted between the side walls of the slot and arranged to swing upwards in the slot as the terminal portion moves from its lower position to its upper position the ejector plate during its upward movement pushing the suspended nails out of the slot into the nail container thus freeing the slot from nails but for a few nails suspended by the outer slot portions.

According to a thirteenth aspect of the invention a terminal lower slot portion at its proximal end with respect to the pivot shaft is delimited by a shoulder having an undercut recess into which the supporting portion of one or two suspended nails can slide backwards towards the pivot shaft and be accommodated on upward movement of the terminal portion.

According to a fourteenth aspect of the invention the slot inside the wall located at the discharge end of the container, has on each side at the bottom of the container, wedges rising towards said wall to such a height that a nail sliding transversely to the slot towards said wall on downward pivotal movement of the container is lifted off the slot such that the supporting portion of the suspended nail e.g. its head can pass freely underneath the transverse nail and out of the container.

According to a fifteenth aspect of the invention depending resilient finger means are pivotally supported at their upper ends across the container at some distance from the discharge end wall, said finger means being arranged to arrest the sliding mass of nails when the container moves downward to the lower position of the terminal portion, the lower ends of said finger means being adapted thereafter to swing away from the discharge end wall thereby orienting some of the nails parallel to the slots.

According to a sixteenth aspect of the invention an elongate plate is slidingly connected to the end wall at the slot such that the plate rests across the slot during the downward, feeding movment of the nails but is lifted from the slot on upward return sliding movement of the nails into the container said plate having at its bottom end a cut to allow the supporting portion, e.g. the head, of a suspended nail to pass.

The invention will be described in greater detail hereinbelow with reference to the accompanying drawings in which:

FIG. 1 schematically shows a positioning and feeding device of a known type;

FIG. 3 is an enlarged view as seen from above in the sense III in FIG. 2;

FIG. 4 is a section as seen in the sense IV in FIG. 3;

FIGS. 5 and 6 show the device of FIG. 4 in two further working positions;

FIG. 7 is a section taken along the line VII—VII in FIG. 2 and shows an embodiment of the invention which is devised for a special nail without a head, a so-called rivet nail.

FIG. 8 is a section taken along the line VIII—VIII in FIG. 7;

FIG. 9, on a larger scale, is a section through portions IX in FIG. 5,

FIG. 10 is a section through the end portion of the feed slot.

FIG. 11 is a vertical section of the device through a nailslot, at the lower end position.

FIG. 12 is a corresponding section at the upper end position.

FIG. 13 on a larger scale illustrates the portion indicated by XIII in FIG. 11 showing an undercut recess slot, FIG. 14 is a view as seen from above as indicated by XIV in FIG. 11, FIG. 15 is a section taken along the line XV—XV in FIG. 14, and FIG. 16 is a section taken along the line XVI in FIG. 15.

Figure 1:
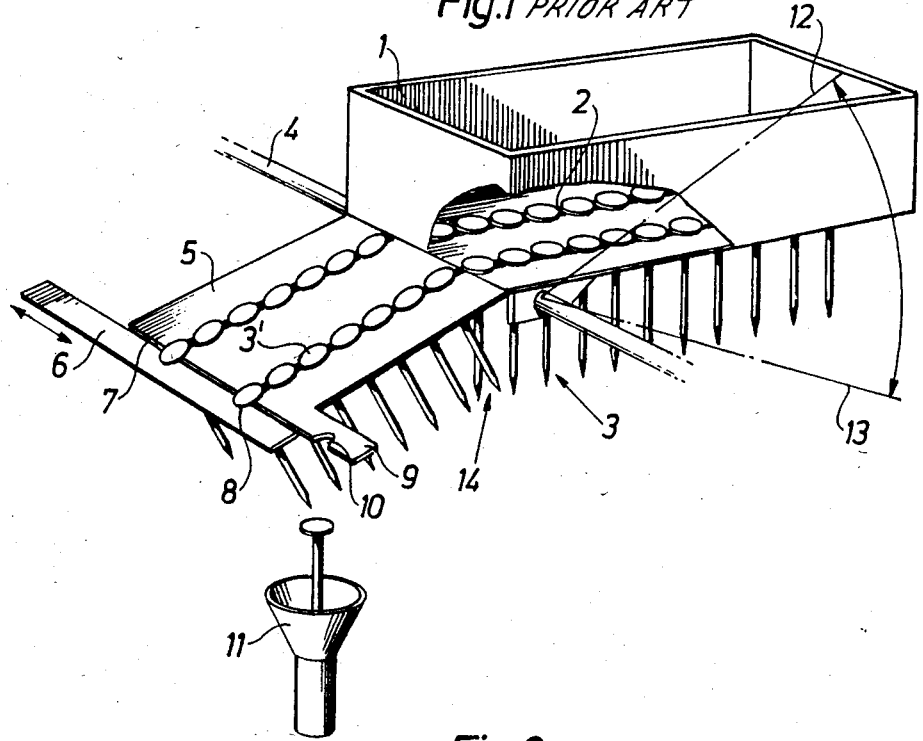

In FIG. 1 1 designates a box or container into which nails are loosely filled. 2 designates a slot which is provided in the bottom of the container 1 and into which nails 3, during the oscillating movement of the container about its horizontal position, can drop and remain suspended by their heads in a row of nails. The container 1 pivots at its lower front edge about an articulation 4 from which stationary slots 5 extend obliquely downwards and terminate at a straight edge which a reciprocating shuttle 6 engages with a straight edge 7 in which recesses 8 are provided at intervals which are equal to the spacings between the stationary slots 5. When the shuttle occupies the position in which the recesses 8 are in register with the slots 5, a nail 3' will slide into the recess 8 the depth of which is so adjusted that only one nail can be received in the recess. Then, when the shuttle 6 moves laterally, it will entrain one nail in each recess and stops opposite a recess 10 in a stationary bar 9 engaging the straight edge 7 of the shuttle 6. The recesses 8 and 10, at one end position of the shuttle, together form an opening of such a size that the nail will drop into a funnel 11 located underneath the opening, and is conveyed through a tube or hose to the nailing site.

The filling container 1 pivots about the horizontal position between an upper position 12 and a lower position 13. The nails in the row of nails 3 will then slide back and forth in the slot 2 in the bottom of the container 1. At the articulation 4, the nails are fed into the stationary slots 5 in which the nails 3' will be hanging by their heads. When the slots 5 are completely filled with nails 3' and the slot 2 in the filling container is also filled with nails 3, the shanks of the uppermost nails 3' in the stationary slot 5, during the oscillatory movement of the container 1, will be brought into engagement with the shanks of the nails 3 in the slot 2 which are located closest to the articulation 4 in the area 14. The nails 3, 3' adjacent the articulation 4 may force each other sideways and get jammed when engaging each other, whereby the feeding operation is interrupted. Also when the nails 3' are fed laterally by the shuttle 6 from the slot 5 to the funnel 11, the nails may jam and interrupt the feeding operation as the recesses 8 and 10 move with respect to each other.

Figure 2:
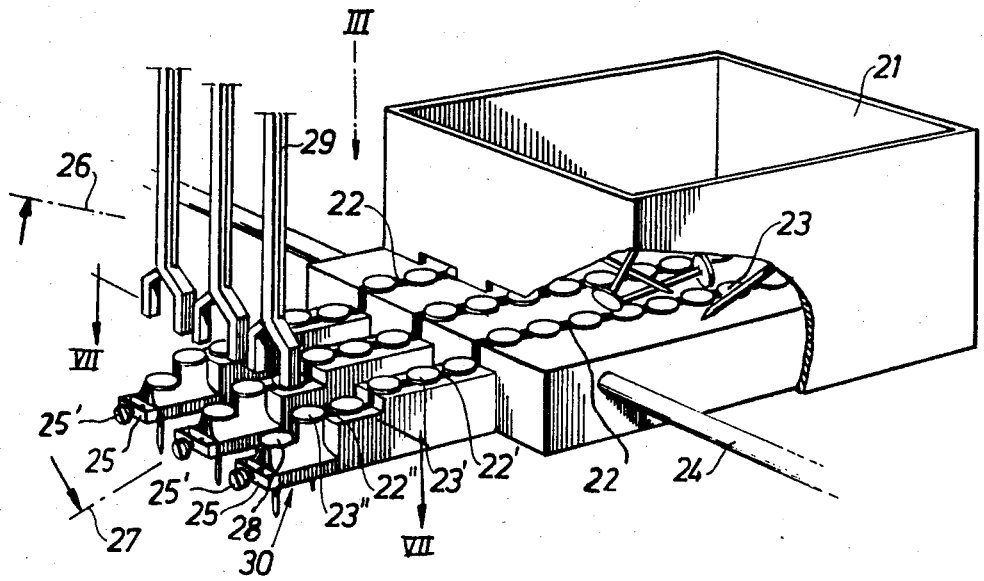
FIG. 2 is a schematic perspective view, with parts broken away, of a device according to the invention.

In FIG. 2, there is schematically shown an embodiment according to the invention which in a simple and ingenious way fully obviates the above-mentioned risks of functional troubles. In the Figure, 21 designates the filling container for the nails, 22 designates one of an optional plurality of slots arranged side by side in the bottom of the container 21, and 23 designates nails which have been suspended by their heads in the slot 22 as the end portion 25 of the positioning and feeding device pivots about the articulation 24 between an upper end position 26 and a lower end position 27. Since there is no transfer of nails from movable to stationary guides at the articulation 24, this may be located in an optional position, and it is possible to achieve a satisfactory balance of the entire device during its oscillating movement.

When the end portion 25 is in the lower end position 27, the nails 23 will slide forwards in the direction of feed and pass from the slot 22 by a shoulder down onto a lower portion 22' of the slot. The nails 23' in this first lower portion 22' of the slot are prevented, in the upper position of oscillation 26 of the device, from sliding rearwards over the shoulder between the slots 22 and 22'. In the device now described, there is a second, still lower slot 22", and the nails 23" in this portion 22" of the slot are prevented in the same way as earlier described, from sliding rearwards in the upper position 26 of the device, by a shoulder between the slots 22' and 22". When the slot occupies its lower end position 27, the nails are prevented from sliding off the device by means of a stop 25 provided at the terminal portion 30 of the slot 22" in that the outermost nail 28 is arrested by the stop 25.

When the slot 22" is in its upper position of oscillation 26, the head of the outermost nail 28 is raised and inserted or pressed in between the resilient jaws of a gripping member or a pair of tongs 29 which is movable horizontally. The tongs 29 seize the uppermost part of the nail, i.e. normally the head of the nail, and retain the nail while the device is swung to the lower position 27 which is so located that the entire nail 28 in this position has been withdrawn from the slot 22". The nail 28 is then fed onwards as will be explained in more detail below.

FIG. 3 shows one of the slots of the device as seen from above (sense III in FIG. 2) and illustrates the top part of the slot 22' with the nails 23' as well as the shoulder between the slot portions 22', 22". It also appears from this figure how the outermost nail 28 in the row of nails 23" is prevented from sliding off the slot by means of an abutment or stop 25. This abutment may be stationary but, in the shown embodiment, it is a set screw 25' which can be so adjusted that the outermost nail 28 will be in a suitable position for engagement by the tongs 29 shown in FIG. 2.

FIG. 10 is a section of the terminal portion 30 taken through the row of nails 23" suspended in the slot 22". The set screw 25' screwed through the stop 25 is so adjusted that the head of the outermost nail 28 abuts with its edge on the shoulder to the slot portion 22". In this manner, the nail 28 will be held safely in place for engagement by the gripping member 29.

In FIG. 3, 30 designates the terminal portion of the slot portion 22" having recesses 31 and 32 which are so adapted that the head of the outermost nail 28 protrudes laterally from the narrow guide ribs defined by the recesses 31, 32.

FIG. 4 is a section of the terminal portion 30 taken along the line IV—IV in FIG. 3 and shows the outermost nail 28. In this figure are shown the recesses 31 and 32 as well as the two guide ribs 33 and 34 which carry the outermost nail 28 by its head. In the shown embodiment, the length of the nails is greater than the height of the slot 22". From the figure it appears that the tongs 29 can seize about and retain the head of the nail 28 without being hindered by the two guide ribs 33 and 34 on which the head rests. This figure shows the position in which the terminal portion 30 is in its upper end position 26.

FIG. 5 shows the position of the terminal portion 30 when it is in its lower end position 27 in which the nail 28, maintained by the tongs 29, is well above the terminal portion 30.

FIG. 6 shows how the tongs 29 holding the nail 28 have been moved a distance 35 laterally away from the terminal portion 30 such that the nail 28 will hang precisely above the funnel 32 in which the nail 28 is dropped once correctly positioned. From the funnel 32 the nail passes through a nose or tube to the nailing site in a per se known manner.

After the tongs 29 have released the nail 28, they will again move the distance 35 in the opposite direction so as to be located straight over the terminal portion 30 when this again reaches its upper position 26 (FIG. 4) with a new nail 28 in the outermost position. The tongs 29 will grasp the nail 28 by the head and the process as now described will be cyclically repeated.

In FIG. 7, there is shown another embodiment of the invention in which the positioning and feeding device is designed for a rivet nail 41. This nail has no head but two bulging expandable tip portions 42 and 43 which are designed for riveting and are at right angles to each other. The bulges at the tips or points of the nail 41 are such that the bulge 43 located at that point of the nail which will drop into the deep slot 36 will position the nail in rotational respect such that the expandable portion 42 of the opposite point of the nail is located transversely of the longitudinal direction of the slot, recesses 37 and 38 being so designed that the bulging portion 42 will rest on narrow edges or ribs 39 and 40. In the position shown in this figure, the end portion of the slot 36 is in its upper position 26 and so the tongs 29 with their resilient jaws 29' can seize about the upper bulge 42 and retain the nail as the device moves downwardly towards its lower position 27, whereby the nail is completely withdrawn from the slot 36 and a cycle similar to that of FIGS. 4, 5 and 6 can be performed.

FIG. 8 is a section through the resilient jaws 29' of the tongs 29 and the riveting nail 41 in FIG. 7 taken along the line VIII—VIII. The jaws are formed with depressions or V-shaped grooves 45 which extend in the longitudinal direction of the nail 28 and enclose the bulging portion 42 of the nail 41. The nail will hereby be guided and held safely in place.

FIG. 9 is a section through the resilient jaws 29" of the tongs 29 taken at IX—IX in FIG. 5. 46 designates a straight or annular groove which receives the head of the nail 28 in such a manner that the nail will be safely retained in a correct position.

In FIGS. 11 and 12 50 designates a nail container and 51 a nail slot. 52 is the distant wall of the slot 51 whereas the proximate wall is cut away. Nails 53 are suspended by their heads in the nail slot 51 within the nail container. The height of the walls of the slot are greater than the total length of the nails 53. The slot 51 extends through the end wall 54 of the nail container 50 and has an opening 55 allowing the supporting portion of the nails to pass through the wall. Outside the end wall 54 the slot 51 terminates in projection 56, protruding above an undercut recess 57 into which one or two nails can slide and be accommodated when the nails slide backwards towards the pivot shaft 58 as illustrated in FIG. 12. From the recess 57 a nail slot 51' extends towards the terminal portion 59 of the slot and at the terminal end there is a short slot 51" sloping downwards by an angle such that the slot 51" approximately is horizontal in the upper end portion 61. The slot portion 51" is adapted to accommodate one single nail. In FIG. 11 the terminal portion occupies its lower end position 60. In this position all the nail slots 51, 51' and 51" are filled with nails.

FIG. 11 also depicts an ejector plate 62 having a pivot 63. The ejector plate 62 can move between two positions, the lower one being indicated in FIG. 11 and the upper one in FIG. 12. At the upper end position 61 the edge 64 of the plate is approximately at the top level of the slot 51. The ejector plate is pivoting in the slot 51 and the thickness of the plate is somewhat smaller than the width of the slot. The ejector plate is displaced by the action of a hydraulic cylinder or any power source. At the lower end position 60 the ejector plate 62 takes the position given in FIG. 11. The action of the ejector plate will be described in more detail later on.

FIG. 12 illustrates the situation of the device being in the upper end position 61. When moving to this position the nails in the slots as well as the mass 66 of nails in the container have moved backwards under the action of gravity. The outermost nail 53" is kept in place by a shoulder 65 (see FIG. 13) whereas some nails 53' are suspended in the nail slot 51', the two innermost nails being accommodated under the projections 56 which efficiently prevent the nails from sliding backwards into the container.

On the upward movement of the device the ejector plate 62 is simultanously displaced from its lower position illustrated in FIG. 11 to its top position illustrated in FIG. 12. In doing so all nails suspended within the slot 51 inside the container are ejected from the slot which generally means that all nails carried by the slot 51 are ejected and the slot is quite free to accept nails on the downward movement of the device.

It has been found that the action of the pivoting ejector plate 62 is very favourable in securing a controlled nail feed and that nails are fed to the depressed nail slot 51' at such a rate that there will not occur any lack of nails in the nail feed. The high walls 52 of the nail slot also contributes to a controlled and undisturbed feeding action of the device. As can be seen from FIG. 12 the outermost nail 53" is supported by the slot portion 51" being mainly horizontal in this position of the device. This means that the nail is suspended very stable as the head of the nail has large supporting areas.

FIG. 13 in more detail illustrates the projections 56, the undercut recess 57 and nails 53' suspended in the slot 51' by their heads thus being prevented from leaving the slot 51' by the projections 56, which cover the heads of the innermost nails 53'.

In FIG. 14 the numbers 50, 51, 53, 54, 55, 56 and 57 are the same designations as previously described. By 66 a mass of nails is indicated and 67 indicates wedges rising towards the end wall 54. Close to the end wall 54 the wedges have such a height that when sliding forward nails of the mass 66 being mainly transverse to the slot 51 are lifted by the wedges to such at height above the bottom of the nail container that the supporting portions of the nails, e.g. the nail heads, can freely be fed along the nail slot 51 through openings 55, 70 and out of the container unobstructed by the nail mass 66. This secures a good serviceability and trouble-free action of the device.

FIG. 15 clearly shows how the mass of nails 66 are lifted by the wedges 67 above the heads of the nails 53 and adds to the clearness of the action of the wedges 67. FIG. 15 further illustrates an elongate sliding plate 68 being slidable along the end wall 54 as indicated by the double-headed arrow 69. The sliding movement 69 is achieved by a small hydraulic cylinder or any suitable means. FIG. 15 illustrates the lower end position where the nail mass 66 abuts the end wall 54 and consequently also the sliding plate 68. The sliding plate 68 rests on the top of the slot 51 and has an opening 70 for free passage of the supporting head of the nails 53.

As the device moves on its upper end position 61, the nails sliding backwards, the sliding plate 68 is lifted from the slot so that the full opening 55 of the end wall 54 is uncovered, thereby avoiding nails to be stuck by a small opening in the end wall 54. This action of the plate 68 further contributes to the touble-free operation of the nail feeding device.

In FIG. 16 numbers 51, 53, 54, 55, 66, 67, 68, 69 and 70 refer to the same designations as previously described.

In the FIGS. 11 and 12 72 designates a depending resilient finger means, pivotally supported at 75 at its upper end 73. The pivot shaft 75 extends across the container at some distance from the discharge end wall 54. The finger means 72 are arranged rather close to one another in a comb-like fashion resulting in the nails passing the finger means being mainly parallel to the direction of the slot 51. On reaching the lower end position 60 the finger means 72 pivot anti-clockwise by pivot shaft 75 allowing more nails to pass and to be oriented mainly along the slot 51.

It is obvious that if it is desirable to increase the capacity of the nail positioning and feeding device, it is possible to arrange an arbitrary number of slots side by side, which cooperate with tongs that can be simultaneously moved laterally for feeding nails to collecting funnels. It is also possible, by means of an adjustment device, to vary the oscillating movement about the pivot shaft and the distance between the pivot shaft and the terminal portion in such a manner that the upper and lower end positions are adapted to different nail lengths. Other modifications may also be adopted within the spirit and scope of the accompanying claims.

We claim:

1. A device for the positioning and individual feeding of nails, comprising a nail receiving container which is pivotal upwards and downwards about a horizontal pivot shaft and in the bottom of which there are formed one or more slots which are substantially perpendicular to said pivot shaft and in which the shanks of the nails can be accommodated while the nails are maintained suspended by their upper parts, for instance their heads, characterized in that each slot (22) passes and extends beyond the wall located at the discharge end of the container (21), and forms a feed slot (22', 22") which protrudes outside the container (21) and in the end portion (30) of which there is provided a stop (25) of such a design that the outermost nail (28) of the fed nails (23") is maintained in a correct position at the outermost end of said end portion (30) which is spaced from said pivot shaft (24) such that the end portion will perform a substantially vertical oscillating movement between a lower end position (27) and an upper end position (26); the height of the side walls (52) of the slot (51) being greater than the full length of the suspended nails (53); and an ejector plate (62) pivoted between the side walls of the slot (51) and arranged to swing upwards in the slot as the terminal portion (59) moves from its lower position (60) to its upper end position (61) the ejector plate (62) on its upward movement pushing the suspended nails (53) out of the slot (51) into the nail container (50), thus, freeing the slot (51) from nails but for a few nails (53, 53' in FIG. 2) suspended by the outer slot portions.

2. A device for the positioning and individual feeding of nails, comprising a nail receiving container which is pivotal upwards and downwards about a horizontal pivot shaft and in the bottom of which there are formed one or more slots which are substantially perpendicular to said pivot shaft and in which the shanks of the nails can be accommodated while the nails are maintained suspended by their upper parts, for instance their heads, characterized in that each slot passes and extends beyond the wall located at the discharge end of the container and in the end portion of which there is provided a stop of such a design that the outermost nail of the fed nails is maintained in a correct position at the outermost end of said end portion which is spaced from said pivot shaft such that the end portion will perform a substantially vertical oscillating movement between a lower end position and an upper end position;

the said slot, in the direction of feed, having progressively depressed portions, which are delimited by shoulders, towards the end portion, whereby the nails carried in the respective slot portions will be prevented from sliding in a direction contrary to the direction of feed as the end portion occupies its upper end position;

a terminal lower slot portion (51') at its proximal end with respect to the pivot shaft (58) is delimited by a shoulder (56), having an undercut recess (57) into which the supporting portion of one or two suspended nails (53', FIG. 13) can slide rearwards towards the pivot shaft (58) and can be accommodated on upward movement of the terminal portion (59).

3. A device for the positioning and individual feeding of nails, comprising a nail receiving container which is pivotal upwards and downwards about a horizontal pivot shaft and in the bottom of which there are formed one or more slots which are substantially perpendicular to said pivot shaft and in which the shanks of the nails can be accommodated while the nails are maintained suspended by their upper parts, for instance their heads, characterized in that each slot (22) passes and extends beyond the wall located at the discharge end of the container (21), and forms a feed slot (22', 22'') which protrudes outside the container (21) and in the end portion (30) of which there is provided a stop (25) of such a design that the outermost nail (28) of the fed nails (23'') is maintained in a correct position at the outermost end of said end portion (30) which is spaced from said pivot shaft (24) such that the end portion will perform a substantially vertical oscillating movement between a lower end position (27) and an upper end position (26); and an elongate plate (68) slidingly (69) connected to the end wall (54) at a slot (51) such that the plate (68) rests across the slot (51) during the downward feeding movement of the nails (53) but is lifted from the slot on upward return sliding movement of the nails into the container, said plate (68) having at its bottom end a cut (70) to allow the supporting portion, e.g. the head, of a suspended nail to pass.

* * * * *